United States Patent

Blackmon et al.

[11] Patent Number: 5,956,191
[45] Date of Patent: Sep. 21, 1999

[54] LIGHT WEIGHT REFLECTOR FACET

[75] Inventors: James B. Blackmon, Brownsboro, Ala.; Kenneth W. Stone, Huntington Beach, Calif.; Stephen M. Kusek, Huntsville, Ala.

[73] Assignee: McDonnell Douglas Corporation, Huntington Beach, Calif.

[21] Appl. No.: 09/071,338

[22] Filed: May 1, 1998

Related U.S. Application Data

[62] Division of application No. 08/786,146, Jan. 21, 1997, Pat. No. 5,751,503.

[51] Int. Cl.$^6$ .............................. G02B 5/08; G02B 7/182
[52] U.S. Cl. ....................... 359/846; 359/847; 359/848; 359/849; 359/850
[58] Field of Search .................................. 359/846, 847, 359/848, 849, 850, 853, 872, 883, 884; 136/245

[56] References Cited

U.S. PATENT DOCUMENTS

| | | | |
|---|---|---|---|
| 4,035,065 | 7/1977 | Fletcher et al. | 359/848 |
| 4,171,876 | 10/1979 | Wood | 359/853 |
| 4,191,164 | 3/1980 | Kelly | 126/439 |
| 4,468,849 | 9/1984 | Anderson et al. | 29/526 R |
| 4,469,089 | 9/1984 | Sorko-Ram | 126/438 |
| 4,475,794 | 10/1984 | Baker et al. | 359/900 |
| 4,678,292 | 7/1987 | Miyatani et al. | 359/883 |
| 5,069,540 | 12/1991 | Gonder | 359/853 |
| 5,104,211 | 4/1992 | Schumacher et al. | 359/853 |
| 5,154,777 | 10/1992 | Blackmon et al. | 136/245 |

FOREIGN PATENT DOCUMENTS

| | | |
|---|---|---|
| 363210801 | 9/1988 | Japan . |
| 1291201 | 11/1989 | Japan . |
| 405127004 | 5/1993 | Japan . |

OTHER PUBLICATIONS

Hass et al., Reflectance and durability of Ag mirrors coated with thin layers of Al O plus reactively deposited silicon dioxide, Nov. 1975, pp. 11–12.

*Primary Examiner*—Cassandra Spyrou
*Assistant Examiner*—Mohammad Y. Sikder
*Attorney, Agent, or Firm*—Alston & Bird LLP

[57] ABSTRACT

A light weight arcuate reflector facet, for a solar concentrator is disclosed, which comprises a thin mirrored glass sheet such as a microsheet, and a backing sheet or substrate, the glass sheet being bonded to the backing sheet, with the backing sheet providing a smooth surface to the glass sheet. A support member or support structure is attached to the backing sheet and maintains the mirrored glass sheet at a desired radius of curvature. The backing sheet is preferably a composite, and according to one embodiment of a fixed focal length light weight reflector facet, the support member is a resin-impregnated fiberglass sheet having a rib structure. In another embodiment of a variable focal length light weight reflector facet, the support member is a mechanical structure comprising a circular support structure having intersecting center support beams positioned diagonally across the circular support structure. An actuator rod is mounted at the center of the support beams and attached to the backing sheet, and is effective when actuated, to deflect the mirrored glass sheet to a desired curvature, and including corner supports for the circular support structure.

13 Claims, 2 Drawing Sheets

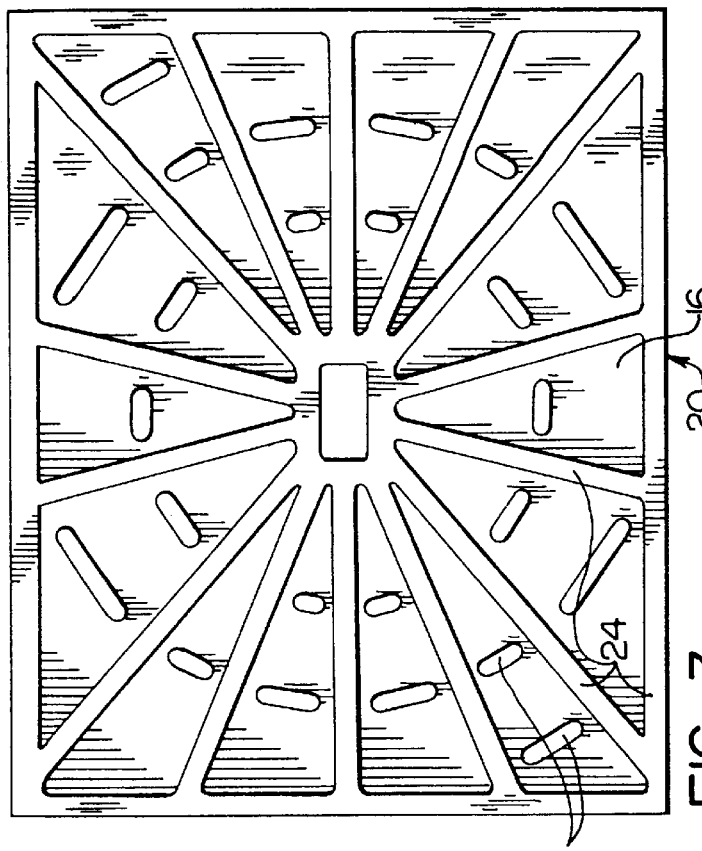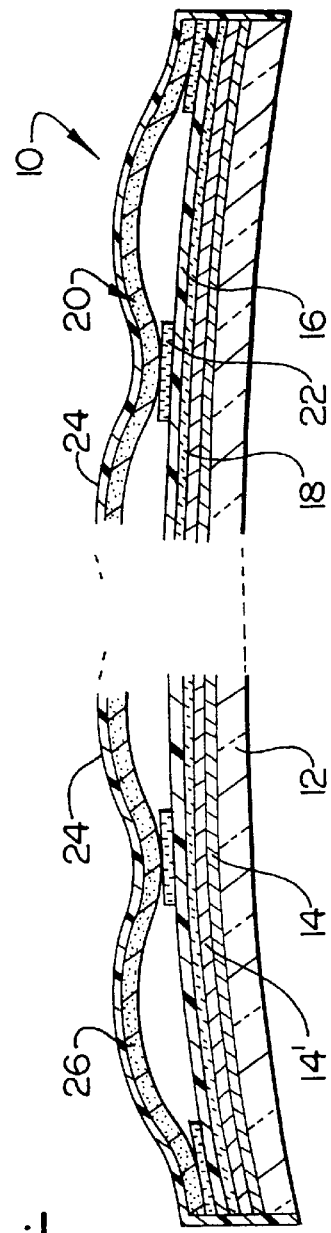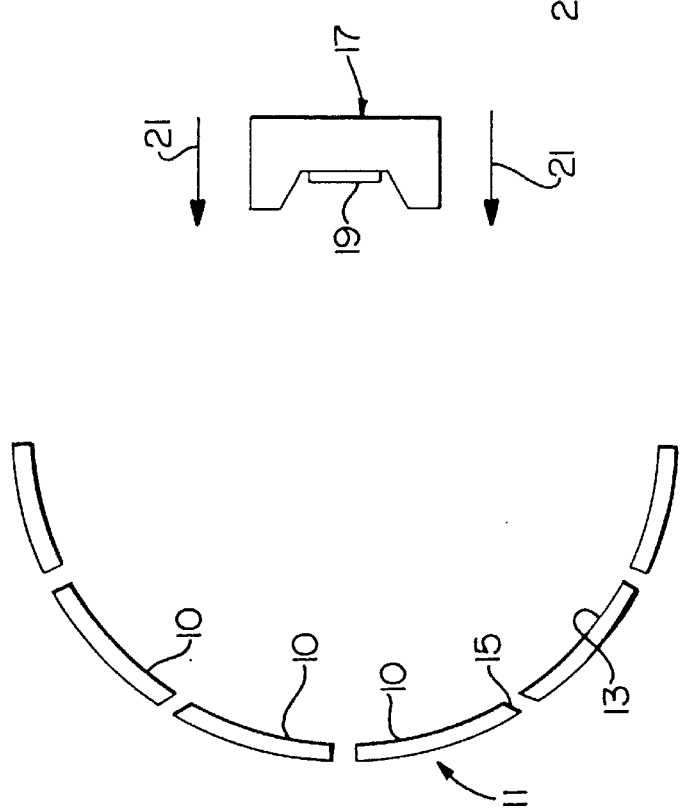

LIGHT WEIGHT REFLECTOR FACET

RELATED APPLICATION

This application is a division of U.S. patent application Ser. No. 08/786,146 filed on Jan. 21, 1997, now U.S. Pat. No. 5,751,503 the contents of which are incorporated in their entirety herein.

BACKGROUND OF THE INVENTION

Both terrestrial and space solar energy systems are needed which achieve high power and energy to mass ratios, long life, and high efficiency at low cost. For space power systems in particular, low mass is a requirement of increasing importance, especially as the energy levels increase and the energy sub-system mass needed for large satellites and advanced lunar and planetary surface applications becomes a greater fraction of the total system mass. Long life and system operational integrity are necessary to achieve low cost, especially with space solar energy systems. High efficiency, for both thermal energy and electric power needs, is a related requirement to achieve high power to mass ratio and low cost.

Solar concentrators can provide improved energy to mass ratios, long life and high efficiency for both thermal energy and electric power needs, especially if the concentrator reflector elements can be designed to achieve and maintain high optical performance and low mass per unit area.

The present day non-concentrating, flat array solar cell conversion systems are low in efficiency and limited to power levels of the order of 1 to 10 $KW_e$. In order to achieve higher power levels, the size and number of arrays must be increased, but this increases the complexity of the system integration issues.

The flat arrays are also difficult to protect from the space environment, in particular atomic oxygen. Therefore, the performance of the system decreases with time. This performance degradation requires that more array area be added in order to have the required end-of-life power for the payload.

Within the last few years there have been significant advances in the efficiency of solar cells. However, in order to achieve this efficiency, the sun energy must be concentrated from 100 to 500 times.

A solar photovoltaic concentrator system has the advantage of relatively small cell area located in the central, focal (concentrated irradiance) zone. See U.S. Pat. No. 5,154,777 to J. B. Blackmon, K. W. Stone, R. A. Gerrick, and N. E. Jones.

Concentrators can thus be used to increase the efficiency, reduce mass, reduce the area of obscuration, simplify various system integration issues, and ultimately greatly reduce cost. For these reasons, the use of concentrating solar photovoltaic systems will increase substantially in the future, and the need for a lightweight, high optical performance, long life reflector facet for such concentrators will become a paramount requirement.

Similarly, concentrating solar thermal power systems require low cost, low mass, efficient reflector facets to focus sunlight onto the receivers used to heat the working fluids used in the power conversion units, such as Brayton, Stirling or Rankine engines.

Over the last 5–10 years there have been various advances in the development of lightweight reflective surfaces such as inflatables and the facet for the NASA Space Station Advanced Development Concentrator. The inflatable type of reflective surfaces are delicate, are not expected to achieve long life, and have not achieved the required surface shape and optical quality. The NASA Advanced Development Concentrator type facet has a high reflectance loss such that 10 to 30% of the energy is reflected at angles beyond the receiver due to "print through" reflective surface distortion. There have also been problems with the shape of the facet changing with time and temperature/humidity variations.

One object of the invention is to provide an improved light weight reflector facet.

Another object is the provision of an efficient light weight reflector facet for a solar photovoltaic concentrator system.

A particular object of the invention is to provide a light weight reflector facet of the above type having high reflectivity, low surface "waviness", good structural stability and integrity, good optical quality over temperature extremes, and low mass per unit area.

SUMMARY OF THE INVENTION

Broadly, according to the invention, there is provided a light weight arcuate reflector facet for a solar concentrator and especially adapted for a concentrating solar thermal power system, which comprises a thin mirrored glass sheet which is referred to as a microsheet, and a backing sheet or substrate, the glass sheet being bonded to the backing sheet, with the backing sheet providing a smooth surface to the glass sheet. A support member or support structure is attached to the backing sheet and maintains the mirrored glass sheet at a desired radius of curvature.

According to one embodiment of a fixed focal length light weight facet, the facet is composed of a thin glass flexible microsheet that has a reflective surface such as silver on the backside, although other reflective surfaces such as a luminizing gold can be used. The mirrored glass can have a protective coating such as copper and mirror backing paint. The mirrored glass is bonded to a backing sheet or substrate, e.g. a composite, which provides a smooth surface for the flexible glass. The backing sheet is bonded to a support structure, such as a cured resin impregnated fiber, e.g. fiberglass, sheet, employing a suitable adhesive such as a silicone adhesive. The support structure not only maintains the arcuate reflective surface at the desired radius of curvature, but also provides the means to mount the facet to the main structure.

According to another embodiment, a variable focal length light weight reflector facet can be provided having a composition similar to that described above but wherein the support member is a mechanical structure comprising a circular support structure having intersecting center support beams positioned diagonally across the circular support structure. An actuator rod is mounted at the center of the support beams and attached to the backing sheet, and is effective when actuated, to deflect the mirrored glass sheet to a desired curvature, and including corner supports for the circular support structure. The support member is adhesively bonded to the backing sheet or substrate.

The light weight reflector facet of the invention has a number of advantages. These include low mass per unit area and higher optical qualities than other types of concentrating reflector facets, i.e., low surface waviness, small radius of curvature variations (of the order of a few inches out of 1000 inches), and high reflectivity. The reflectivity has been measured at 96 to 98% which is as high as, or higher than, other designs.

Protection of reflective surfaces from space environments is achieved with the reflector facet of the invention. The reflective surface (typically silver) is protected from the front by the microsheet glass and the back is protected by the support structure. An edge sealant such as silicone is used to protect the edges. Because of the construction of the facet, the reflective surface is resistive to impact by foreign bodies such as meteorite or other structural impact. The local area of impact may be destroyed but surrounding areas will not be substantially affected. The reflector facet of the invention can be used in the form of facet "tiles" such that if one tile is broken, the effect on the optical performance of the entire facet is minimized. Low distortion over a range of temperatures is achieved due to matching the composite materials and their fiber orientation with the glass to minimize thermal stress. Because the materials of construction all have nearly the same thermal expansion coefficient, therefore the optical performance is relatively insensitive to variations in temperature.

DESCRIPTION OF THE DRAWINGS

FIG. 1 is a schematic view of a concentrator containing a plurality of reflector facets in a solar photovoltaic concentrator system;

FIG. 2 is a schematic cross-section of a composite fixed focal length light weight facet according to the invention;

FIG. 3 is a plan view of the composite of FIG. 2, particularly illustrating the support structure;

DETAILED DESCRIPTION OF THE INVENTION AND PREFERRED EMBODIMENTS

Figure 4:
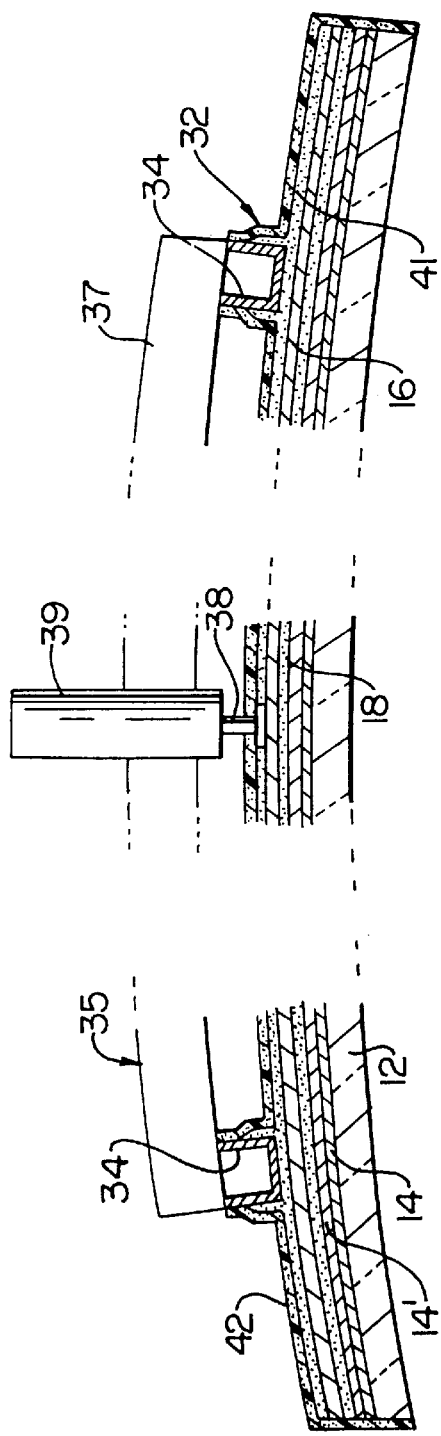
FIG. 4 is a schematic cross-sectional view of a variable focal length light weight facet according to the invention.

Referring to FIG. 1, there is illustrated a solar concentrator 11 having a reflective surface 13 formed of a plurality, e.g. six to ten, segments or reflector facets 10, according to the invention. The spaces 15 between reflector facets 10 are made as small as possible and a support structure (not shown) is provided behind the facets 10 to support all of the facets in the concentrator 11.

A receiver 17 having solar cells as indicated at 19, or thermal cycle engine is spaced from the concave reflective surface 13 of the concentrator 11 to receive solar rays originating from behind the receiver and reflected from the reflective surface 13 of the concentrator into the solar cells 19 of the receiver. It will be seen that the size of the receiver 17 is substantially smaller than the aperture opening across the concentrator so as to prevent blockage of most of the solar rays 21 being transmitted from behind the receiver.

Referring to FIGS. 2 and 3 of the drawing, a fixed focal length light weight reflector facet 10 having a fixed radius of curvature is shown having a mirror 12 in the form of a thin glass sheet, preferably microsheet glass having a thickness of 2 mil–10 mil and being flexible. The mirror 12 has a silver layer 14 on the back side, although other reflective surfaces such as a luminizing gold, can be used on the back side. The mirrored glass preferably has a protective coating 14' such as a copper layer and a mirror backing paint over the reflective silver layer 14.

The mirrored glass 12 is bonded to a backing sheet or a substrate 16 composed of a composite such as the material marketed as Micarta, a composite comprising fiberglass with a silicone based resin, which is thin, e.g. of the order of 0.031"–0.015", which provides a smooth surface to support the glass mirror without introducing additional surface waviness. Other materials having suitable physical properties can be used. A glass adhesive such as the material marketed as MAC film by the MACtac Corporation, and having a thickness of about 2 to about 6 mil and indicated at 18, bonds the substrate 16 to the glass microsheet 12.

The substrate 16 is bonded to a support structure or support member 20 by a suitable bonding adhesive 22. The support structure 20 according to one embodiment is resin impregnated fiberglass sheet which is ribbed as shown at 24 and 25 in FIG. 3 for added strength, as the structural support required to maintain the radius of curvature of the mirrored sheet. Ribs 24 are higher than the peripherally disposed smaller ribs 25. The fiberglass support structure 20 has a thermal coefficient of expansion equal to or similar to that of glass. Other composite materials having high strength, high modulus and thermal coefficients of thermal expansion equal to that of glass can be used, such as graphite-epoxy.

The bonding adhesive 22 between the substrate 16 and the support structure 20 can be any suitable adhesive, such as a silicone based adhesive, which bonds the substrate to the support structure. Other suitable adhesives can be employed.

For space applications, a thin layer of a material resistant to orbital atomic oxygen degradation may be employed. Materials such as aluminum or silicon dioxide films, as indicated at 26 which are resistant to atomic oxygen can be applied to the back surface of the support structure 20, particularly to protect the resin in the fiberglass structure 20.

If desired, UV inhibitors such as the product marketed as Tinuvin 328 by Ciba-Geigy Corp. optionaally can be added to the adhesives to protect the adhesive bonds from degradation.

In constructing the fixed focal length reflector facet 10 illustrated in FIGS. 2 and 3, a sheet of microsheet flexible glass, e.g. having a thickness of 0.002 to 0.010" having a silver backing layer vacuum or chemically deposited on the glass is provided. The silver layer 14 is coated with copper and mirror backing paint for the protection of the silver.

A sheet of MAC film or equivalent sheet adhesive is laid on a flat table and then a Micarta substrate is laid on top of the sheet adhesive. For high rate production the MAC film and substrate can be joined continuously by pinch rollers or the adhesive film may be applied to the substrate. The sheet adhesive is trimmed to the size of the facet. A spray adhesive alternatively may be applied.

The silvered sheet glass is laid on a flat table and the substrate or backing sheet with the adhesive sheet applied thereto is then placed on top of the microsheet glass with the adhesive in contact with the back of the glass microsheet. The substrate and glass sheet with adhesive therebetween is then passed through a roller system to press the backing sheet to the mirrored glass.

The pressed glass mirror and backing composite is placed on a vacuum table having a curved top that has the desired radius of curvature. The curvature of the surface of the table accounts for "springback" of the mirror assembly. That is, the radius of curvature of the vacuum table mold is more than that required for the mirror because the mirror assembly tends to become somewhat flatter following fabrication. The table surface has a series of curved grooves that are connected to internal vanes. The grooves allow the vacuum to suck down the flexible glass subassembly to the top of the table. A sheet of composite is placed on top of the mirror assembly and used to press the mirror assembly down on the fixture on the table. Once the surface of the mirror is pressed against the table, the vacuum will hold the assembly to the table, and the composite sheet is removed.

Viewing FIG. 2, a bonding contact adhesive such as a silicone based adhesive is applied at 22 to the backing sheet 16 in the contact areas between the support structure ribs 24 and between support structure ribs 25, as shown in FIG. 3. The support structure 20 is composed of a rigid resin impregnated fiberglass sheet and the adhesive is applied to the backing sheet in a relatively thick layer, e.g. about 1/8", such that any variations in thickness in the fiberglass support structure will be taken up with the thickness of the adhesive. The fiberglass support structure which is molded to give the rib sheet structure as shown on FIG. 3, is substantially rigid but can be bent down at the corners.

The resin impregnated fiberglass ribbed support structure is then placed over the adhesive coated backing sheet on the mirror assembly and pressed down at the corners of the support structure against the backing. Pressure is maintained on the support structure until the silicone bonding has cured to bond the support structure to the backing subassembly. To increase the adhesive cure rate, heat may be applied by various means, e.g. electrically, or with heating tapes or lamps, or by using the vacuum table in a thermal control chamber or by use of microwaves.

A protective layer such as aluminum or silicon dioxide can be applied to the back surface of the support structure to render the reflector facet resistant to atomic oxygen. This step is considered optional.

The result of this process is the light weight reflector facet of the invention illustrated in FIGS. 2 and 3, having a predetermined radius of curvature and a fixed focal length.

Figure 5:
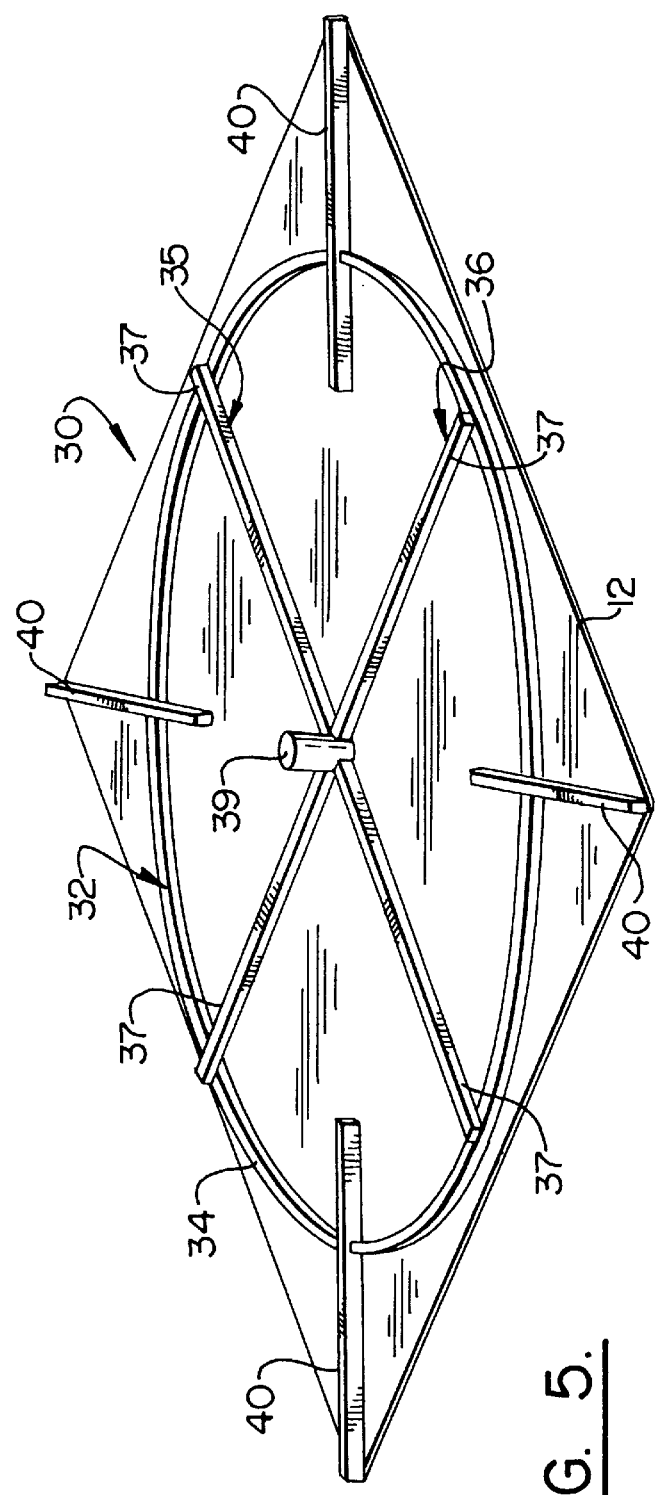
FIG. 5 is a prospective plan view of the reflector facet of FIG. 4, particularly showing the mechanical support structure for the facet.

Another embodiment of the invention in the form of a variable focal length light weight reflector facet is shown in FIGS. 4 and 5. In this embodiment the microsheet glass 12, with silver coating 14, and protective coating layer 14', the backing sheet or substrate 16 and the adhesive layer 18, as in the case of the embodiment of FIG. 2 is employed, except that the fiberglass support structure 20 thereof is replaced by a circular or ring support structure 32 used to provide the outer main support for the facet. The backing sheet or substrate 16 may not cover the entire glass subassembly. Also, the backing sheet may be a mesh material that is laid on back of the glass subassembly and coated with a resin.

Referring particularly to FIG. 5, the support structure 32 of the variable focal length light weight reflector facet 30 is formed of a circular member or ring 34 having two perpendicular center support beams 35 and 36 positioned diagonally across the circular support member 32. The ring 34 has a channel cross section, as seen in FIG. 4. Beams 35 and 36 each form a pair of aligned radial beams 37, and provide the support for deflecting the center of the mirror so as to form an arcuate reflector facet. The actuator rod 38 of an actuator 39 mounted at the center or intersection of support beams 35 and 36 is attached directly to the substrate or backing 16, employing a composite and resin. When power is applied to the actuator 39 the substrate 16 and mirror or reflective surface 12 in FIGS. 4 and 5 is deflected and drawn upwardly by the actuator rod to provide the desired curvature to the reflector facet. A magnetic actuator, piezoelectric activator or linear motor can be used to deflect the mirror 12 and attached substrate 16. Additional corner support beams 40 are used for corner support. The components 34, 35, 36 and 40 are all bonded by adhesive 41 to the backing 16.

In the fabrication of the variable focal length facet 30 of FIGS. 4 and 5, a curved molding fixture similar to the one employed in the fabrication of the fixed focal length reflector facet 10 of FIGS. 2 and 3 is employed. The curvature of the fixture is slightly more than the nominal required focus to allow for "springback" of the facet assembly. In addition, the corners of the molding fixture can be shaped other than curved in order to correct for corner spring back as a result of the unsupported areas of the corners. The glass mirror microsheet 12 is laid down on the fixture and a vacuum is applied to pull the glass down at the corners to conform to the surface of the fixture. An even coat of adhesive is applied to the back of the substrate or backing 16 in the location where the circular support structure 32 will lie. The main ring support 34, corner supports 40 and activator rod 38 are placed on the back of the substrate 16 on top of the resin adhesive and pressed down. A second coat of adhesive 42 is now applied over the backing or substrate 16 and along the sides of members 34 and 40. The adhesive is allowed to dry with the vacuum still holding the bonded assembly of the reflective mirror 14 and substrate 16 down. The cross beam center support structure 35, 36 is then mounted on the substrate 16 across the ring support 34, the outer ends of beam members 35 and 36 attached to ring support 34. The resulting variable focal length light weight facet permits focusing or defocusing of the light beam as desired in space by suitable powering of the actuator rod 38 to change the curvature of the reflector facet.

The reflector facet of the invention provides a number of novel features and advantages. Thus, the invention provides a means for obtaining a very optically accurate reflective surface by employing an accurate tooling surface and a compliant adhesive between the reflective surface or mirror and the support structure to adjust for the surface variation of the support structure. The sandwiched mirror and backing substrate provides a smooth surface on which to mount the glass mirror. Such smooth surface results in a low surface waviness, provides protection to the silver on the back of the mirror and provides structured stiffness to the mirror. This support structure allows thinner glass to be used which results in lower cost, weight and higher reflectivity. The invention provides a reflector facet that can be defocused easily in the case of an emergency because of a safety problem or to vary the focus distance small amounts in order to adjust the flux to optimize the performance of the system. Light weight and high optical performance even with large variations in temperature is achieved by using composite materials such as fiberglass having coefficients of thermal expansion nearly equal to that of glass. Maintenance of reflector surface integrity even when one part of the reflector facet is damaged is achieved by using "tiles" of microsheet glass bonded to the substrate. Use of "tiles" of microsheet glass allows thinner microsheet to be used and minimizes the wastage due to breakage.

Since various changes and modifications of the invention will occur to those skilled in the art within the spirit of the invention, the invention is not to be taken as limited except by the scope of the appended claims.

What is claimed is:

1. A light weight arcuate reflector facet for a solar concentrator which comprises:
   a mirrored glass sheet having a small radius of curvature, a highly reflective and non-wavy specular surface, and a thickness in the range of 0.002 to 0.010 inch;
   a backing sheet bonded to said mirrored glass sheet and conforming to the small radius of curvature of the mirrored glass sheet such that substantially the entire surface of the mirrored glass sheet is supported by the backing sheet, wherein said backing sheet includes a smooth surface for bonding to said mirrored glass sheet such that essentially no pattern print forms on the surface of said mirrored glass sheet, thereby reducing undesired light scattering, and wherein said backing sheet has a thermal expansion coefficient similar to said mirrored glass sheet such that changes in temperature do not cause said backing sheet to alter the curvature of the mirrored glass sheet;

an adhesive securing the mirrored glass sheet to the backing sheet, wherein said adhesive is compliant to allow the backing sheet to conform to the curvature of the mirrored glass sheet; and a support member attached to said backing sheet, wherein said support member maintains said mirrored glass sheet at the small radius of curvature for relatively short focal distances.

2. The reflector facet of claim 1, wherein said mirrored glass sheet comprises a glass microsheet having a radius of curvature of a few feet per thousand feet of length such that said mirrored glass sheet can form the small radius of curvature without induced stress.

3. The reflector facet of claim 1, wherein said mirrored glass sheet comprises a reflective layer for increasing the reflectivity of said mirrored glass sheet.

4. The reflector facet of claim 1, wherein said backing sheet comprises a composite material.

5. The reflector facet of claim 4, wherein said backing sheet has a thickness of 0.031 to 0.015 inches.

6. The reflector facet of claim 1, wherein said support member is formed of a material having a thermal coefficient of expansion similar to that of glass such that changes in temperature do not cause said support member to alter the curvature of the mirrored glass sheet.

7. The reflector facet of claim 1, wherein said support member is formed from a resin-impregnated ribbed fiberglass sheet.

8. The reflector facet of claim 7, wherein said backing sheet is bonded to said support member with a silicone resin.

9. The reflector facet of claim 8, wherein said backing sheet is formed from a fiberglass material having a silicone based resin.

10. The reflector facet of claim 1 further comprising a thin layer of material bonded to a back surface of said support member, wherein said material is resistant to orbital atomic oxygen degradation.

11. The reflector facet of claim 1, wherein said support member comprises:

a support structure; and an actuator rod having opposed ends, wherein one end of said actuator rod is operably connected to said support structure and said opposed end is operably connected to said backing sheet, such that said actuator when actuated applies a force to said mirrored glass sheet, thereby deflecting said mirrored glass sheet to a desired curvature.

12. The reflector facet of claim 11, wherein said backing sheet is bonded to said corner supports of said support member.

13. The reflector facet of claim 11, wherein said support member further comprises corner supports for supporting edges of said support structure.

* * * * *